US005101221A

United States Patent [19]

Takeuchi et al.

[11] Patent Number: 5,101,221

[45] Date of Patent: Mar. 31, 1992

[54] RECORDING HEAD DISTAL-END SUBSTRATE HAVING OPPOSED RECORDING ELECTRODE ARRAY AND RETURN CIRCUIT ELECTRODE SHEET

[75] Inventors: Yukihisa Takeuchi, Aichi; Toshikazu Hirota; Shigeki Okada, both of Nagoya, all of Japan

[73] Assignee: NGK Insulators, Ltd., Japan

[21] Appl. No.: 694,489

[22] Filed: May 2, 1991

[30] Foreign Application Priority Data

May 16, 1990 [JP] Japan ................................ 2-126248

[51] Int. Cl.[5] ............................................ G01D 15/10

[52] U.S. Cl. ................................ 346/76 PH; 346/155

[58] Field of Search ........................... 346/76 PH, 155

[56] References Cited

U.S. PATENT DOCUMENTS 4,651,168 3/1987 Terajima et al. ............... 346/76 PH
4,990,934 2/1991 Takeuchi et al. .............. 346/76 PH

FOREIGN PATENT DOCUMENTS 54-141140 11/1979 Japan .
58-12790 1/1983 Japan .
61-35972 2/1986 Japan .
61-230966 10/1986 Japan .
62-292461 12/1987 Japan .

*Primary Examiner*—Benjamin R. Fuller
*Assistant Examiner*—Gerald E. Preston
*Attorney, Agent, or Firm*—Parkhurst, Wendel & Rossi

[57] ABSTRACT

A recording head operable to apply an electric current to an electrically resistive layer provided on a recording medium or a planar intermediate member interposed between the medium and the recording head. The head includes an electrically insulating substrate, and at least one recording electrode formed on one of opposite major surfaces of the substrate. The substrate is formed of an electrically insulating material whose wear resistance is lower than that of the recording electrode or electrodes. The substrate has a distal end portion extending from a proximal portion by a predetermined distance from the proximal portion for contact with the electrically resistive layer. The distal end portion has a thickness smaller than that of the proximal portion, as measured in a direction perpendicular to a direction of extension of the distal end portion. At least one return circuit electrode formed from a metal or metal alloy sheet is provided on the other major surface of the substrate remote from the recording electrode(s).

11 Claims, 1 Drawing Sheet

RECORDING HEAD DISTAL-END SUBSTRATE HAVING OPPOSED RECORDING ELECTRODE ARRAY AND RETURN CIRCUIT ELECTRODE SHEET

BACKGROUND OF THE INVENTION

1. Field of the Invention

This invention relates in general to a recording head for recording or printing images such as characters and graphical representations, by applying an electric current to a recording medium or a ribbon or film or other form of intermediate member interposed between the recording medium and the recording head. More particularly, the present invention is concerned with the construction of a distal end portion of such a recording head at which the head contacts the recording medium or intermediate member.

2. Discussion of the Prior Art

Various types of recording head for recording by application of an electric current to a recording medium or an intermediate member have been proposed up to the present. In particular, there is known a recording head having a laminar or multi-layered structure which includes a substrate or substrates, and an array of recording electrodes and an array of return circuit electrodes which are supported by or formed on the substrate or substrates. Examples of this type of recording head are disclosed in laid-open Publication Nos. 61-35972, 62-292461, 54-141140, 58-12790 and 61-230966 of unexamined Japanese Patent Applications.

As disclosed in the publications identified above, the recording head of the type indicated above is adapted such that an electric current is applied to an electrically resistive or conductive layer formed or coated on or carried by a suitable recording medium or a suitable planar intermediate support member in the form of a sheet, film or ribbon. The electrically resistive or conductive layer may be formed on a roller or other support member, or constitute an inner layer of the recording medium or support member. In a recording operation by using an intermediate ribbon or film having an electrically resistive layer and an ink layer, for example, an electric current applied to the resistive layer through the recording head causes Joule heat to be generated by the resistive layer, whereby selected local areas of the ink layer are heated, and the ink material in these heated local areas is fused, vaporized or diffused. As a result, the ink material is transferred to the appropriate local areas of the recording medium so as to form a black or colored image. If an electric current is applied directly to a recording medium, the appropriate local areas of the medium are suitably colored due to Joule heat generated by an electric current, or due to removal of the covering material from the medium surface due to an electrical discharge occurring thereon The electrically resistive layer provided on the recording medium or intermediate support member may be an electrically conductive layer, an electrically conductive or resistive ink layer (which serves also as an ink-bearing layer), a heat-sensitive layer having an electrolyte, or any form of layer through which an electric current may flow.

In a recording or printing operation by the recording head for use with the recording medium or intermediate support member as described above, the recording electrodes and the return circuit electrode or electrodes must be held in electric contact with the electrically resistive layer of the recording medium or support member. To this end, the electrodes used in the known recording heads as disclosed in the publications indicated above are formed of a material which has a higher degree of wear resistance than the material of the substrate structure and the material of an electrically insulating layer used for the heads.

However, the mere selection of the materials suitable for the electrodes, substrate structure and insulating layer is not sufficient for maintaining good electrical contact of the electrodes with the electrically resistive layer for a prolonged period of time. As the accumulative operating time of the recording head increases, one of the recording electrode array and the return circuit electrode array is worn to a greater extent than the other electrode array, causing poor electrical contact of that electrode array with the electrically resistive layer, or separation of the electrode array from the substrate due to friction therebetween. Thus, it is difficult to maintain good electrical contact between the electrodes and the resistive layer.

Another problem occurs when the recording head is operated to effect a printing operation at a high speed. In this case, the ink material tends to spread beyond nominal areas of the selected local spots on the recording medium, due to the heat generated by the energized electrically resistive layer, whereby the printed images are likely to get blurred or foggy. In this respect, there is a need of improving the quality of printing by the recording head of the type indicated above.

SUMMARY OF THE INVENTION

It is therefore an object of the present invention to provide a recording head for recording by application of an electric current to a recording medium or an intermediate member interposed between the head and the medium, which recording head assures excellent electrical contact of the electrodes with the medium or intermediate member, and which permits efficient dissipation of the heat generated by the electrically resistive layer to prevent an excessive rise of its temperature, thereby making it possible to perform a high-speed and high-quality recording operation.

The above object may be attained according to the principle of the present invention, which provides a recording head operable to apply an electric current to an L electrically resistive layer provided on a recording medium or a planar intermediate member interposed between the medium and the recording head, comprising an electrically insulating substrate, and at least one recording electrode formed on one of opposite major surfaces of the substrate, the substrate and the at least one recording electrode being adapted to be held, at a distal end of the recording head, in contact with the electrically resistive layer, wherein the substrate is formed of an electrically insulating material whose wear resistance is lower than that of the at least one recording electrode, and the substrate has a proximal portion, and a distal end portion extending from the proximal portion by a predetermined distance from the proximal portion for contact with the electrically resistive layer. The distal end portion has a thickness smaller than that of the proximal portion, as measured in a direction perpendicular to a direction of extension of the distal end portion. Further, at least one return circuit electrode formed from a metal or a metal alloy sheet is provided on the other of the opposite major surfaces of the substrate.

The recording head of the present invention constructed as described above is capable of maintaining good electrical contact of the recording and return circuit electrodes with the electrically resistive layer, for a prolonged period of time, and efficiently dissipating the heat generated by the resistive layer, so as to prevent an excessive rise of its operating temperature, thereby assuring excellent quality of images printed even at a considerably high printing speed.

The at least one return circuit electrode may be either a single common return circuit electrode in the form of a sheet of a metal or metal alloy, or a plurality of return circuit electrodes corresponding to the recording electrodes. In the latter case, the return circuit electrodes take the form of spaced-apart parallel strips, or a comblike patterned sheet having parallel strip portions. However, the single common return circuit electrode is desirable for improved contact stability and efficient dissipation of heat.

The present invention was developed based on the following finding in connection with a recording head having a laminar structure which includes wear-resistant recording and return circuit electrodes. That is, the return circuit electrode or electrodes has/have improved hardness and wear resistance values, when the return circuit electrode or electrodes is/are formed from a sheet (which may be a foil) of a selected metal or metal alloy, rather than a metal film or a metal alloy film. The improvement in the hardness and wear resistance assures excellent electrical contact of the return circuit electrode or electrodes with the electrically resistive layer, for an extended period of time.

The present invention is also based on a finding that the heat generated by the resistive layer can be easily and efficiently dissipated through the metal or metal alloy sheet of the return circuit electrode or electrodes which has a high thermal conductivity, whereby an otherwise possible excessive rise of the operating temperature of the recording head can be prevented, to thereby permit a high-quality high-speed recording operation.

BRIEF DESCRIPTION OF THE DRAWINGS

The above and other objects, features and advantages of the present invention will be better understood by reading the following description of presently preferred embodiments of the invention, when considered in connection with the accompanying drawings, in which.

DETAILED DESCRIPTION OF THE PREFERRED EMBODIMENTS

Figure 1:
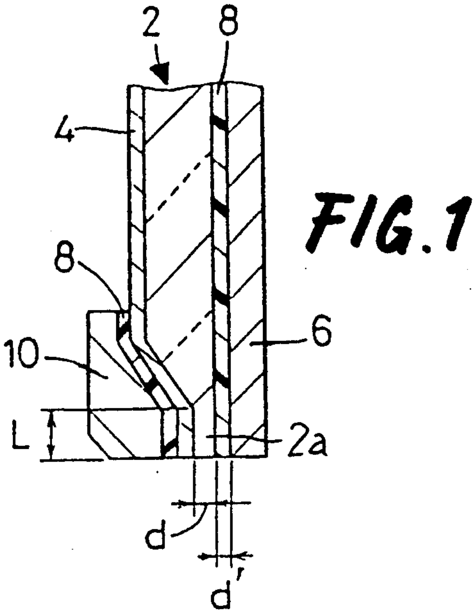
FIGS. 1 and 2 are fragmentary elevational views in cross section of two different forms of a recording head of the present invention, taken in a plane parallel to the direction of extension of the electrodes.
Figure 2:
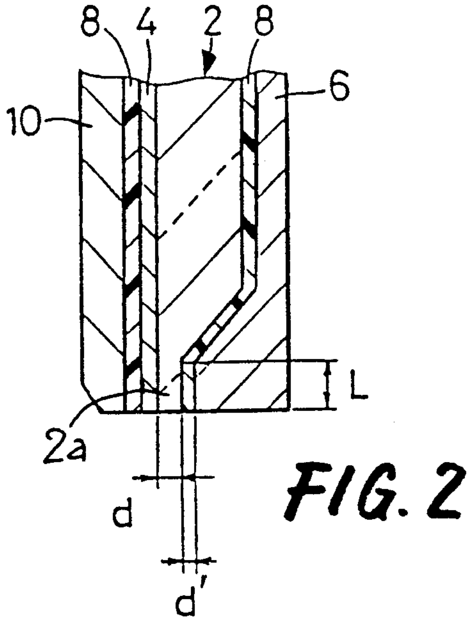
Figure 3:
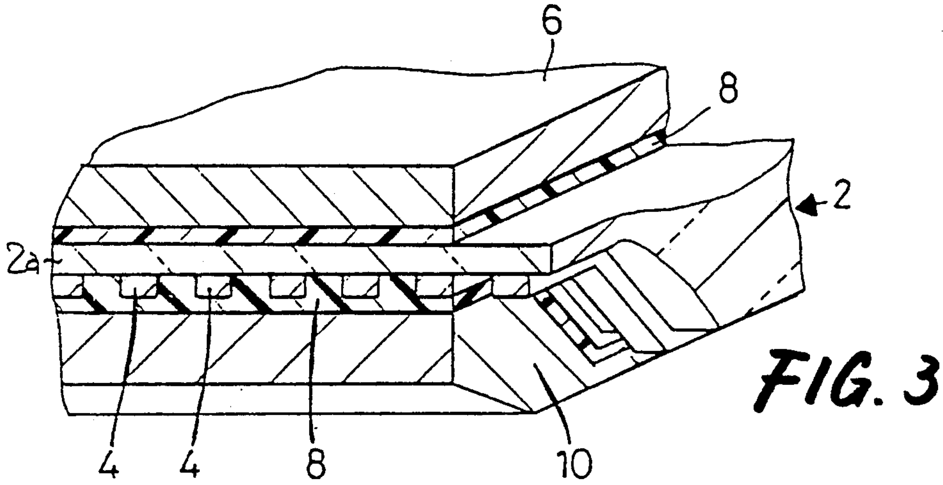
FIG. 3 is a fragmentary perspective view showing the distal end portion of the recording head of FIG. 1.
Figure 4:
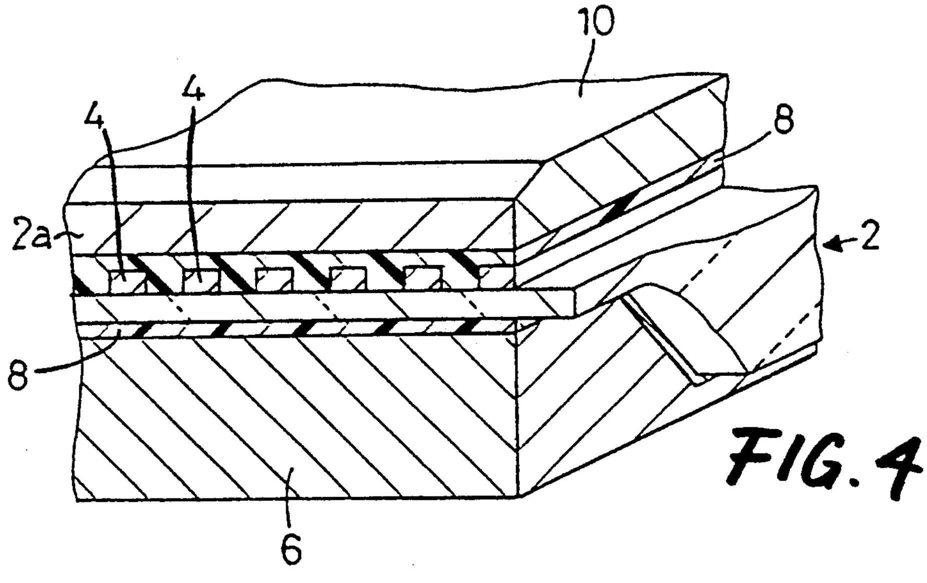
FIG. 4 is a fragmentary perspective view showing the distal end portion of the recording head of FIG. 2.

Referring to the elevational cross sectional views of FIGS. 1 and 2 and the perspective views of FIGS. 3 and 4, there are shown two different forms of the recording head constructed according to the principle of the present invention, each of which has a laminar or multi-layered structure. In these figures, the same reference numerals are assigned to identify the functionally corresponding elements.

In FIGS. 1 and 2, reference numeral 2 denotes a substrate made of an electrically insulating material. On one of the opposite major surfaces of the substrate 2, there is formed an array of recording electrodes 4 in the form of a multiplicity of parallel strips, which are equally spaced apart from each other in the direction perpendicular to the planes of the drawing figures. To the other major surface of the substrate 2, there is bonded a common return circuit electrode 6 through an adhesive layer 8. The return circuit electrode 6 is formed from a sheet made of a metal or alloy. Further, a reinforcing layer 10 is bonded through another adhesive layer 8, to the substrate 2, such that the corresponding end portions of the recording electrodes 4 are embedded in the mass of the adhesive layer 8. Thus, the laminar structure of the recording head consists of the substrate 2, recording electrode array 4, return circuit electrode sheet 6, reinforcing layer 10, and adhesive layers 8 for bonding the return circuit sheet 6 and the reinforcing layer 10 to the substrate 2.

The substrate 2 has a proximal portion (upper portion as seen in FIGS. 1 and 2) which is located remote from the recording medium during operation of the head, and a thin-walled distal end portion 2*a* (lower portion as seen in the figures) which extends from the proximal portion by a suitable length or distance in the direction toward the recording medium, for sliding contact with the recording medium or planar intermediate support member. The thin-walled distal end portion 2*a* has a thickness "d" which is smaller than the thickness of the proximal portion, as measured in the direction perpendicular to the direction of extension of the distal end portion 2*a* from the proximal portion. The distal end portion 2*a*, which has the thickness "d" over a length "L", is formed by forming a recess or cutout in the end portion of one of the opposite major surfaces of the substrate 2. With the thin-walled distal end portion 2*a* thus formed, the recording head has a corresponding recessed distal end portion.

In the thus constructed recording head in which the recording electrodes 4 and the return circuit electrode 6 are formed on the opposite major surfaces of the substrate 2, the distance between the electrodes 4, 6 as measured at the ends for sliding contact with the recording medium or planar intermediate support member is determined by the thickness "d" of the distal end portion 2*a*, and a thickness "d'" of the adhesive layer 8 between the substrate 2 and the return circuit electrode 6. Since the thickness "d" of the distal end portion 2*a* can be accurately controlled by machining the substrate 2, and since only one adhesive layer 8 exists between the distal end portion 2*a* and the return circuit electrode 6, the distance between the electrodes 4, 6 can be accurately controlled, permitting enhanced quality of printing by the instant recording head.

The substrate 2 having the relatively thick proximal portion and the relatively thin distal end portion 2*a* functions also as a layer for electrically insulating the electrodes 4, 6, and therefore eliminates an otherwise required electrically insulating layer whose thickness is sufficiently small over the entire area. Accordingly, the present recording head is comparatively easy to fabricate and has an increased mechanical strength. Namely, the present recording head has a sufficiently small distance ("d"+"d'") between the recording and return circuit electrodes 4, 6 as measured at the distal end at which the electrodes 4, 6 contact the recording medium or planar intermediate support member, whereby a recording operation can be performed with a desired image dot size, with a minimum degree of crosstalk between the electrodes 4, 6. Further, the above-indicated distance ("d"+"d'") is constant in the direction of wearing of the distal end of the head. The instant recording head having a sufficient mechanical strength is also advantageous for its ease of installation on a printing apparatus.

The thickness "d" and the length "L" of the distal end portion 2*a* of the substrate 2 are suitably determined depending upon the materials of the substrate 2 and electrodes 4, 6, the required properties or characteristics of the distal end portion to be exhibited during a recording operation, and the desired force of electrical contact of the electrodes 4, 6 with the resistive layer of the recording medium or planar intermediate support member. Generally, the thickness "d" is preferably 150 μm or smaller, more preferably within a range of 25–90 μm, while the length "L" is preferably within a range of 50–4000 μm, more preferably within a range of 100–1000 μm.

The thin-walled distal end portion 2*a* of the substrate 2 may be formed by grinding, slicing or otherwise precision-machining the substrate 2, so as to provide a recess or cutout in the end portion of at least one of the opposite major surfaces of the substrate 2, so that the cutout has a desired depth depending upon the thickness "d" of the distal end portion 2*a*. After the distal end portion a is formed, the recording electrodes 4 are formed on one of the opposite major surfaces of the substrate 2. In the case of the recording head of FIG. 2, the recording electrodes 4 are formed on the major surface of the substrate 2 which is not machined or otherwise processed for forming the distal end portion 2*a*. In this case, the substrate 2 may be shaped for forming the distal end portion a, after the electrodes 4 are formed on the substrate 2. It is also possible to initially form the substrate 2 which has the distal end portion 2*a*. Further, a thin-walled substrate member and a thick-walled substrate member may be bonded together to provide the substrate 2 having the thin-walled distal end portion 2*a*.

In the examples of FIGS. 1 and 2, the distal end portion 2*a* is provided by forming an inclined shoulder surface adjacent to the proximal end of the distal end portion 2*a*. The shoulder surface is inclined relative to the side surface of the distal end portion 2*a* having the length "L", such that these two surfaces form an obtuse angle externally of the substrate 2. However, the inclined shoulder surface may be replaced by a shoulder surface which is perpendicular to the direction of extension of the distal end portion 2*a* (parallel to the direction of thickness "d"), or by a rounded shoulder surface or fillet which has a suitable radius of arc and which terminates in the side surface of the distal end portion 2*a*.

In the recording heads constructed as described above, the substrate 2 is formed of a material which is selected for good sliding contact of the electrodes 4, 6 with a recording medium, or a planar intermediate support member in the form of a sheet, film or ribbon. More specifically, the substrate 2 is formed of a material which has a lower wear resistance than the material of the electrodes 4, 6. Preferably, the substrate 2 is formed of a ceramic material which has a lower wear resistance and a lower hardness than the material of the electrodes 4, 6, and which can be easily processed or shaped with high precision. It is particularly desirable to form the substrate 2 of a ceramic material selected from the group which consists of: highly machinable glass ceramic containing mica; alumina ($Al_2O_3$) having a relatively low wear resistance; boron nitride (BN); highly machinable ceramic containing boron nitride; highly machinable glass ceramic containing boron nitride; highly machinable ceramic containing boron nitride and aluminum nitride (AlN); and highly machinable glass ceramic containing boron nitride and aluminum nitride. In particular, the highly machinable glass ceramic containing mica is preferably used.

The recording electrodes 4 provided on the respective major surfaces of the substrate 2 are formed of an electrically conductive material which has a higher degree of wear resistance than the material of the substrate 2 which supports the recording electrodes 4. Preferably, a major content of the electrically conductive material for the electrodes 4 is selected from the group which includes: metals such as chromium, titanium, tantalum and zirconium; and compounds of these metals. These materials are advantageously used owing to their comparatively high wear resistance and comparatively low rate of consumption due to an electrical effect during use of the head. Particularly, chromium, and an alloy or a compound containing chromium are preferably used as a major component of the electrically conductive material for the electrodes 4. More preferably, the electrodes 4 are formed principally of an alloy or compound containing both chromium and nitrogen. The electrodes 4 may be formed by first forming a film of the selected electrically conductive material, by a suitable technique such as sputtering, vapor deposition, ion plating, CVD (chemical vapor deposition), coating, printing or plating, and then patterning the film into the respective arrays of the spaced-apart parallel electrode strips 4, by a suitable method such as etching or lift-off method. Desirably, the electrodes 4 have a thickness of at least 1 μm. If needed, the electrodes 4 are plated with nickel, tin, chromium, copper, gold or other suitable metal.

The metal or alloy sheet constituting the return circuit electrode 6 is made of an electrically conductive material having a high thermal conductivity, preferably selected from the group consisting of: Cr; Ti; Ta; Ni; W; Mo; alloys containing these metals; stainless steels; and Fe-Ni alloys. For high durability of the electrode 6, it is particularly desirable to use Cr, Ti, Ta, stainless steels and Fe-Ni alloys, especially, Ti and Fe-Ni alloys, which assure reduced thermal stresses between the substrate 2 and the electrode 6, and which are effective to prevent warpage or deformation of the electrode 6, and separation of the electrode 6 from the substrate.

The thickness of the metal or alloy sheet of the return circuit electrode 6 is suitably determined depending upon the materials of the electrodes, 4, 6, the thickness "d" of the distal end portion 2*a*, required properties or characteristics of the distal end portion 2*a* to be exhibited during a recording operation, and the desired force of electrical contact of the recording and return circuit electrodes 4, 6 with the resistive layer of the recording medium or planar intermediate support member. Generally, the thickness of the electrode 6 is preferably 2000 μm or smaller, more preferably within a range of 20–500 μm.

In the example of FIG. 1, the reinforcing layer 10 is provided so as to partially engage the recess or cutout formed in the substrate 2 to provide the thin-walled distal end portion 2*a*. This reinforcing layer 10 bonded to the substrate 2 through the adhesive layer 8 functions to reinforce the thin-walled distal end portion *2a*. In the example of FIG. 2, on the other hand, the sheet of the return circuit electrode 6 is bonded to the substrate 2 through another adhesive layer 8, such that the sheet follows the surface configuration of the recess or cutout formed in the major surface of the substrate 2 remote from the recording electrodes 4. This electrode 6 functions also as a member for reinforcing the distal end portion *2a* of the substrate 2. The distal end portion *2a* is further reinforced by the reinforcing layer 10 bonded through the adhesive layer 8 to the major surface of the substrate 2 remote from the return circuit electrode sheet 6.

The reinforcing layer 10 provided in the recording heads of FIGS. 1 and 2 is preferably a sheet member which has lower wear resistance and hardness values than the material of the electrodes 4, 6. Particularly preferable sheet members for the reinforcing layer 10 include a highly machinable glass ceramic sheet which may or may not contain mica, a highly machinable ceramic sheet, and a metal sheet whose surface may or may not be treated for electrical insulation. If the reinforcing layer 10 is formed from a sheet of a material having a high thermal conductivity, such as boron nitride or aluminum nitride, the reinforcing layer 10 may also function as a heat-radiating layer. If the reinforcing layer 10 is formed of the same material as that of the substrate 2, that is, if the material of the layer 10 has the same thermal expansion coefficient as that of the substrate 2, the recording head is effectively protected from thermal stresses between the substrate 2 and the reinforcing layer 10, separation of the layer 10 from the substrate 2, or warpage or deformation of the layer 10.

The adhesive layers 8 used for bonding the return circuit electrode 6 and the reinforcing layer 10 to the substrate 2 may be an inorganic adhesive containing alumina, silica or boron nitride, for example, or a resinous adhesive containing epoxy, phenol or polyimide, for example. Alternatively, the adhesive layers 8 may be a mixture of an inorganic material such as alumina, silica or boron nitride, and a resin. Among these adhesives, an inorganic adhesive containing alumina, silica, boron nitride or other inorganic material is most preferably used.

The test samples of the recording heads as illustrated in FIGS. 1 and 2 (FIGS. 3 and 4) were prepared in the following manner:

For the test sample of the recording head of FIGS. 1 and 3, the substrate 2 was formed from a highly machinable glass ceramic sheet containing mica, and a chromium film formed by sputtering on one of the opposite major surfaces of the glass ceramic sheet was patterned by photo-etching method to form an array of spaced-apart parallel strips of chromium. These chromium strips were heat-treated in an atmosphere containing nitrogen gas and a hydrogen gas.

Thus, an array of the recording electrodes 4 in the form of 480 chromium strips was formed on the substrate 2, such that the electrode strips 4 are spaced apart from each other at a spacing pitch of 125 μm. Each electrode strip 4 has a width of 70 μm and a thickness of 6 μm. The distal end portion *2a* of the substrate 2 has a thickness "d" of 70 μm, and a length "L" of 800 μm. To the other major surface of the substrate 2, a 200 μm-thick Ti sheet as the return circuit electrode 6 was bonded with an inorganic adhesive containing alumina. Further, a highly machinable glass ceramic sheet was processed to prepare the reinforcing layer 10, which was bonded with the same adhesive, to the major surface of the substrate 2 on which the recording electrodes 4 were formed.

For the test sample of the recording head of FIGS. 2 and 4, a highly machinable glass ceramic sheet was processed to prepare the substrate 2 whose distal end portion *2a* has the thickness "d" of 80 μm and the length "L" of 1000 μm. On one of the opposite major surfaces of this substrate 2, there were formed the 480 recording electrodes 4, in the same manner as described above with respect to the sample of FIGS. 1 and 3. The spacing pitch of the electrodes 4 is 167 μm, and each electrode 4 has a width of 80 μm. A 500 μm-thick Fe-Ni alloy sheet was processed to prepare the recording electrode 6, which was bonded to the other major surface of the substrate 2, so as to follow the surface configuration of the recess which defines the distal end portion *2a*. To the major surface of the substrate 2 on which the recording electrodes 4 are formed, a highly machinable ceramic sheet containing boron nitride and boron aluminum was bonded as the reinforcing layer 10. An inorganic adhesive containing alumina was used to bond the Fe-Ni alloy sheet 6 and the glass ceramic reinforcing sheet 10 to the substrate 2.

The recording heads produced as described above were tested as incorporated in a recording apparatus, such that the electrodes 4, 6 were held in sliding contact with an electrically resistive layer on an intermediate ink-bearing sheet interposed between a recording paper and the recording head, during repetitive printing cycles. The quality of the images printed by the individual recording heads was evaluated. The test revealed consistently satisfactory results on both the two test samples, namely, sufficiently high density and clearness or crispness of the printed images, and excellent contacting condition of the electrodes 6, 8 with respect to the intermediate ink-bearing sheet, without an excessive temperature rise of the heads, even when the printing operation was effected at a considerably high speed.

While the present invention has been described in detail in its presently preferred embodiments, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A recording head operable to apply an electric current to an electrically resistive layer provided on a recording medium or a planar intermediate member interposed between said medium and the recording head, comprising an electrically insulating substrate, and at least one recording electrode formed on one of opposite major surfaces of the substrate, said substrate and said at least one recording electrode being adapted to be held, at a distal end of the recording head, in contact with said electrically resistive layer, wherein the improvement comprises:

said substrate being formed of an electrically insulating material whose wear resistance is lower than that of said at least one recording electrode, said substrate having a proximal portion, and a distal end portion extending from the proximal portion by a predetermined distance from the proximal portion for contact with said electrically resistive layer, said distal end portion having a thickness smaller than that of said proximal portion, as measured in a direction perpendicular to a direction of extension of said distal end portion; and at least one return circuit electrode formed from a sheet of a metal or metal alloy being provided on the other of said opposite major surfaces of said substrate.

2. A recording head according to claim 1, wherein said at least one recording electrode formed on said one major surface of said substrate consists of a plurality of recording electrodes which are spaced apart from each other in a direction perpendicular to said direction of extension of said distal end portion.

3. A recording head according to claim 1, wherein said at least one return circuit electrode (6) consists of a single common return circuit electrode in the form of said sheet of a metal or metal alloy.

4. A recording head according to claim 1, further comprising a reinforcing layer reinforcing a thin-walled distal end portion of the head which includes said distal end portion of said substrate, said substrate having a recess which determines said thickness of said distal end portion, said reinforcing layer at least partially engaging said recess.

5. A recording head according to claim 1, wherein the thickness of said distal end portion is 150 μm or smaller.

6. A recording head according to claim 5, wherein the thickness of said distal end portion is within a range of 25–90 μm.

7. A recording head according to claim 1, wherein the length of said distal end portion is within a range of 50–4000 μm.

8. A recording head according to claim 7, wherein the length of said distal end portion is within a range of 100–1000 μm.

9. A recording head according to claim 1, wherein said substrate is formed of a material selected from the group consisting of: highly machinable glass ceramic containing mica; alumina having a relatively low wear resistance; boron nitride; highly machinable ceramic containing boron nitride; highly machinable glass ceramic containing boron nitride; highly machinable ceramic containing boron nitride and aluminum nitride; and highly machinable glass ceramic containing boron nitride and aluminum nitride.

10. A recording head according to claim 1, wherein said at least one recording electrode is formed of an electrically conductive material whose major component consists of a metal containing at least one material selected from the group consisting of chromium, titanium, tantalum and zirconium, or a compound thereof.

11. A recording head according to claim 1, wherein said return circuit electrode is formed of an electrically conductive material selected from the group consisting of: Cr; Ti; Ta; Ni; W; Mo; alloys containing at least one of Cr, Ti, Ta, Ni, W and Mo; stainless steels; and Fe-Ni alloys.

* * * * *